United States Patent

Ninomiya et al.

[11] Patent Number: 5,658,528
[45] Date of Patent: Aug. 19, 1997

[54] LEAD-FREE SOLDER

[75] Inventors: Ryuji Ninomiya; Junichi Matsunaga, both of Ageo, Japan

[73] Assignee: Mitsui Mining & Smelting Co., Ltd., Tokyo, Japan

[21] Appl. No.: 712,678

[22] Filed: Sep. 13, 1996

Related U.S. Application Data

[63] Continuation of Ser. No. 619,155, Mar. 21, 1996, abandoned, which is a continuation of Ser. No. 417,911, Apr. 6, 1995, abandoned.

[30] Foreign Application Priority Data

Nov. 2, 1994 [JP] Japan ..................... 6-293880
Feb. 21, 1995 [JP] Japan ..................... 7-056691

[51] Int. Cl.$^6$ ..................... C22C 13/02
[52] U.S. Cl. ..................... 420/562; 420/557; 148/22
[58] Field of Search ..................... 420/557, 562; 148/22

[56] References Cited

U.S. PATENT DOCUMENTS 5,256,370 10/1993 Slattery et al. ..................... 420/557
5,328,660 7/1994 Gonya et al. ..................... 420/562
5,393,489 2/1995 Gonya et al. ..................... 420/561

FOREIGN PATENT DOCUMENTS 6-344180 12/1994 Japan ..................... 420/557
115725 7/1982 Poland ..................... 420/557

OTHER PUBLICATIONS

Artaki, I. and Jackson, A.M., Evaluation of Lead–Free Solder Joints in Electronic Assemblies, Journal of Electronic Materials, vol. 23, No. 8, Aug. 1994.

Primary Examiner—Sikyin Ip
Attorney, Agent, or Firm—Flynn, Thiel, Boutell & Tanis, P.C.

[57] ABSTRACT

A lead-free solder consisting of 1 to 4 wt % of Ag, at least one of Bi and In in respective amounts meeting the conditions that the value of expression (1), A, is equal to or greater than 5.00 and that the value of expression (2), B, is equal to or less than 6.90, and Sn for the balance:

$$A = [Ag\ wt\ \%] + 1.23\ [Bi\ wt\ \%] + 0.52\ [In\ wt\ \%] \quad (1)$$

$$B = [Ag\ wt\ \%] + 1.19\ [Bi\ wt\ \%] + 0.50\ [In\ wt\ \%] \quad (2)$$

This solder has a tensile strength and an elongation as high as those of conventional Pb—Sn solder without containing neither lead nor cadmium, which can cause environmental contamination.

1 Claim, 2 Drawing Sheets

Ag : 1 wt % (Sn : BALANCE)

Ag : 2 wt % (Sn : BALANCE)

Ag: 3wt% (Sn: BALANCE)

Ag: 4wt% (Sn: BALANCE)

LEAD-FREE SOLDER

This application is a continuation of U.S. Ser. No. 08/619 155, filed Mar. 21, 1996, now abandoned, which is a continuation of U.S. Ser. No. 08/417 911, filed Apr. 6, 1995, now abandoned.

BACKGROUND OF THE INVENTION a) Field of the Invention

This invention relates to a lead-free solder which has mechanical properties as good as those of conventional Pb-Sn solder.

b) Description of the Prior Art

Pb—Sn alloys of eutectic or near-eutectic composition are well known as representative solders. Zn—Cd alloys, which have a greater strength than Pb—Sn eutectic solders, are also known. Amid the increased concern with environmental protection in recent years, the harmfulness of lead and the noxious effect of vaporized cadmium on workers have become a problem with the former and latter solders, respectively, and a solder replacing them is needed.

To meet this need, zinc or tin base solders, which contain neither harmful lead nor cadmium, were proposed. The solders hitherto proposed, however, do not have mechanical properties as good as conventional Pb—Sn solders. 3.5 Ag—Sn solder, for example, has a problem of a low tensile strength, though it has a satisfactory elongation. In this present situation, a solder which does not contain harmful lead or cadmium and has both a satisfactory high tensile strength and a satisfactory high elongation is desired.

SUMMARY OF THE INVENTION

The object of the present invention is to provide a solder which does not contain harmful elements such as lead and cadmium and still has both a tensile strength and an elongation as high as those of Pb—Sn solders.

The solder of the present invention consists of 1 to 4 wt % Ag, either one or both of Bi and In of their respective amounts meeting the conditions that the value of expression (1), A, is equal to or greater than 5.00 and that the value of expression (2), B, is equal to or less than 6.90, and Sn for the balance.

$$A=[Ag\ wt\ \%]+1.23\ [Bi\ wt\ \%]+0.52\ [In\ wt\ \%] \quad (1)$$

$$B=[Ag\ wt\ \%]+1.19\ [Bi\ wt\ \%]+0.50\ [In\ wt\ \%] \quad (2)$$

By this composition, the solder of the present invention has a tensile strength equal to or greater than 4.0 kgf/mm$^2$ and an elongation equal to or greater than 30% which are mechanical properties as good as those of conventional Pb—Sn solders.

DESCRIPTION OF THE PREFERRED EMBODIMENTS

In the present invention, silver has the effects of improving the heat resistance, lowering the fusing temperature, and increasing the strength, spreadability and brightness of the solder with only a small amount contained therein. The silver content appropriate for this purpose is equal to or greater than 1 wt %. The upper limit of the silver content is 4 wt %, taking into account the expansiveness of silver.

Figure 1:
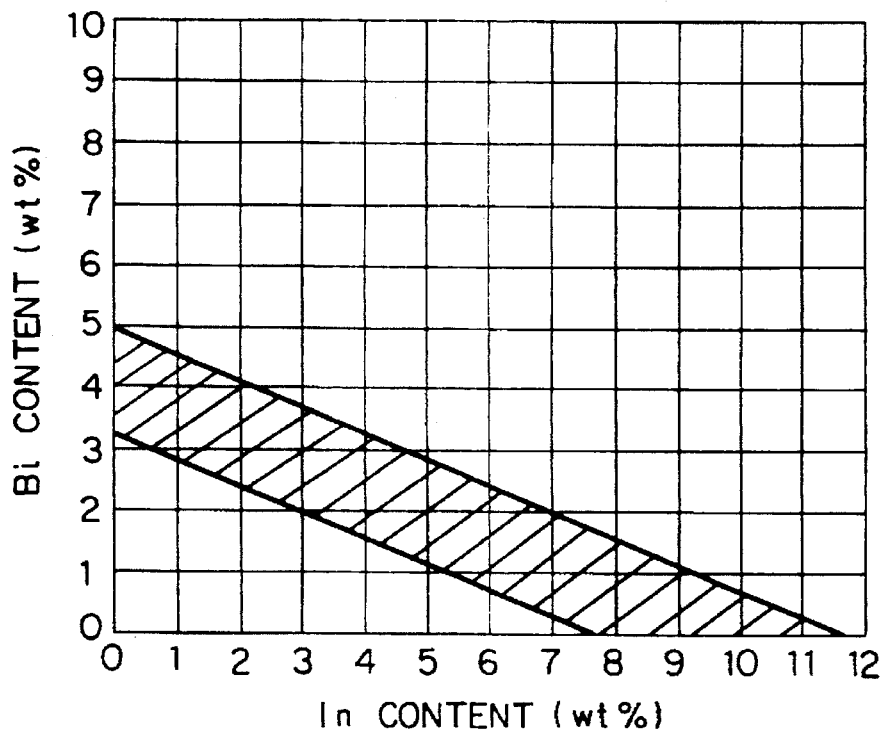
FIG. 1 shows the relationship between the amounts of In and Bi to be added when the Ag content is 1 wt % (Sn for the balance).
Figure 2:
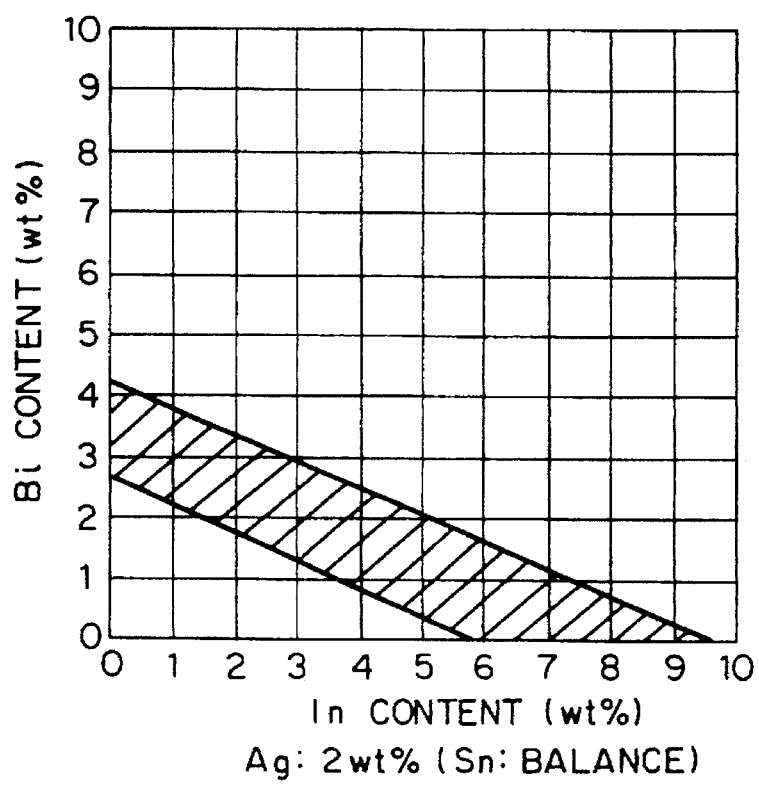
FIG. 2 shows the relationship between the amounts of In and Bi to be added when the Ag content is 2 wt % (Sn fir the balance Sn).
Figure 3:
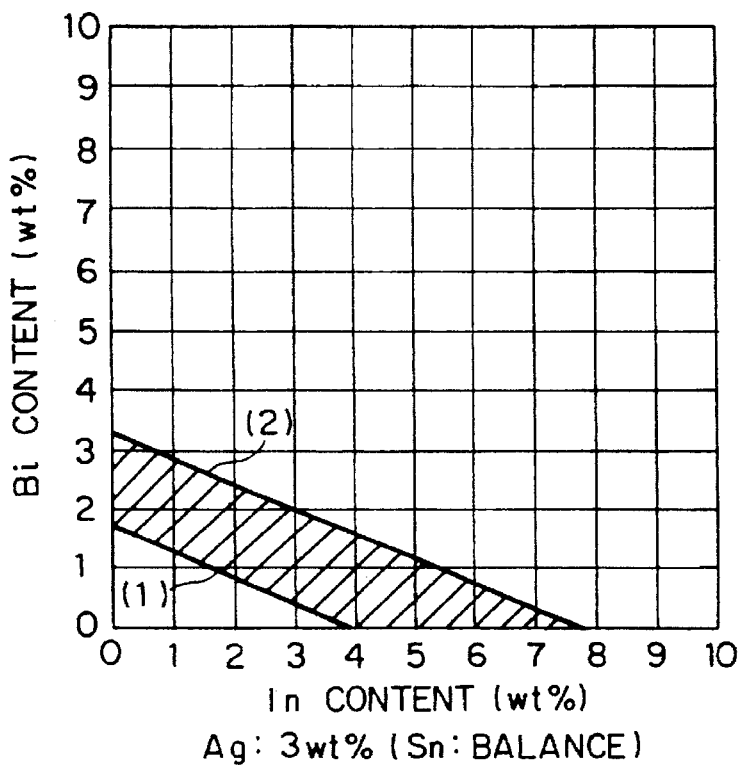
FIG. 3 shows the relationship between the amounts of In and Bi to be added when the Ag content is 3 wt % (Sn for the balance).
Figure 4:
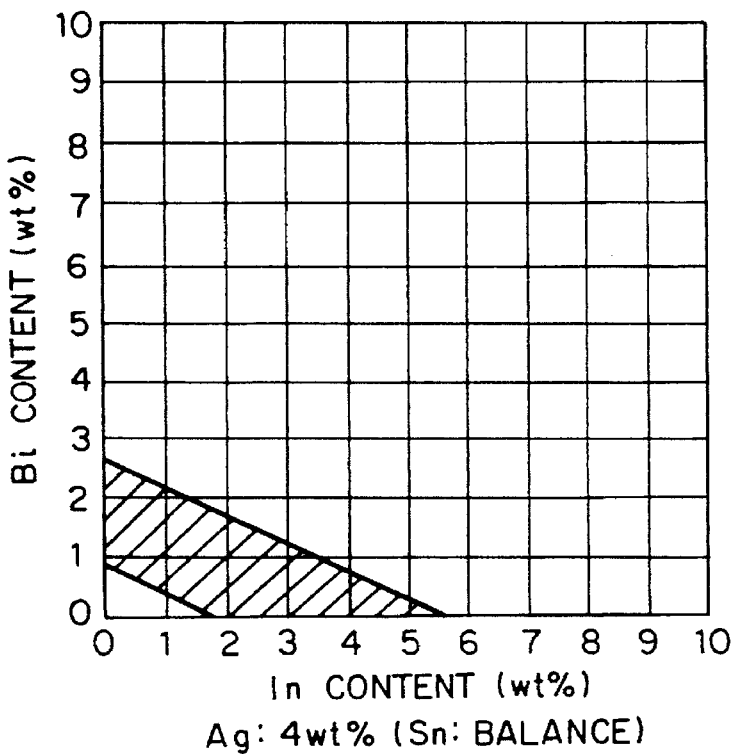
FIG. 4 shows the relationship between the amounts of In and Bi to be added when the Ag content is 4 wt % (Sn for the balance).

The Bi and In contents are within the ranges such that the combination of their contents fall in the hatched area in FIGS. 1 to 4 for 1 wt %, 2 wt %, 3 wt % and 4 wt %, respectively, which can be defined by the conditions that the value of expression (1), A, is equal to or greater than 5.00 and that the, value of expression (2), B, is equal to or less than 6.90, where expressions (1) and (2) represent the upper and lower boundary lines of the hatched area in FIG. 3.

If the value of expression (1), A, is smaller than 5.00, the tensile strength of the solder is lower than 4.0 kgf/mm$^2$. If the value of expression (2), B, is greater that 6.90, on the other hand, the elongation of the solder is lower than 30%.

Since the solder of the present invention may contain either one or both of Bi and In in the amounts as described above, it may be a Sn—Ag—Bi or Sn—Ag—In ternary alloy or a Sn—Ag—Bi—In quarternary alloy.

When the solder is a Sn—Ag—Bi ternary alloy without In, expressions (1) and (2) become as follows:

$$A=[Ag\ wt\ \%]+1.23\ [Bi\ wt\ \%] \quad (1')$$

$$B=[Ag\ wt\ \%]+1.19\ [Bi\ wt\ \%] \quad (2')$$

From these expressions and the aforementioned range of Ag, the Bi content is greater than 0.81 wt % and smaller than 6.4 w %.

If the Bi content is smaller than 0.81 wt %, the tensile strength of the solder is lower than 4.0 kgf/mm$^2$. If greater than 6.4 wt %, the elongation of the solder is lower than 30%.

When the solder is Sn—Ag—In ternary alloy without Bi, expressions (1) and (2) become as follows:

$$A=[Ag\ wt\ \%]+0.52\ [In\ wt\ \%] \quad (1'')$$

$$B=[Ag\ wt\ \%]+0.50\ [In\ wt\ \%] \quad (2'')$$

From these expressions and the aforementioned range of Ag, the In content is greater than 1.9 wt % and smaller than 12 wt %.

If the In content is smaller than 1.9 wt %, the tensile strength of the solder is lower than 4.0. kgf/mm$^2$. If greater than 12 wt %, the elongation of the solder is lower than 30%. However, it is preferable to set the upper limit of the In content to 4.0 wt % because In is expensive.

When the solder is a Sn—Ag—Bi—In quarternary alloy, the Bi content is within the range of 0.81 to 5.0 wt % and the In content is within the range of 1.9 to 12 wt % from expressions (1) and (2) and the range of the Ag content.

EXAMPLES

Sn, Ag, Bi, In and Pb were weighed out to prepare compositions listed in Table 1, each composition being 10 kg in total. These compositions were melted at 300° C. in an electric furnace in the air using a graphite crucible. After all metals had melted, the molten metals were thoroughly stirred to prevent segregation caused by gravity and cast into solder pieces of 10 mm in thickness using a mold of 150 mm×60 mm with a height of 150 mm in inner dimensions. Test samples were cut from the bottom part of the solder pieces according to JIS 4 standards with a machine, and their tensile strength and elongation were measured by the test method defined by the JIS Z2241 standards. The results are shown in Table 1. The strength and the elongation of Pb—Sn eutectic solders and 3.5 Ag—Sn solder are also shown in Table 1 for comparison.

TABLE 1

| Chemical Composition (wt %) | | | | Tensile Strength | elongation |
|---|---|---|---|---|---|
| Ag | Bi | In | Sn | (kgf/mm$^2$) | (%) |
| Example | | | | | |
| 1 | 0 | 8 | Bal. | 4.1 | 35.9 |
| 1 | 0 | 9 | Bal. | 4.3 | 34.2 |
| 1 | 0 | 10 | Bal. | 4.5 | 32.6 |
| 1 | 0 | 11 | Bal. | 4.7 | 31.0 |
| 1 | 1 | 6 | Bal. | 4.1 | 35.3 |
| 1 | 1 | 7 | Bal. | 4.3 | 33.7 |
| 1 | 1 | 8 | Bal. | 4.5 | 32.0 |
| 1 | 1 | 9 | Bal. | 4.7 | 30.4 |
| 1 | 2 | 3 | Bal. | 4.0 | 36.4 |
| 1 | 2 | 4 | Bal. | 4.2 | 34.8 |
| 1 | 2 | 5 | Bal. | 4.4 | 33.1 |
| 1 | 2 | 6 | Bal. | 4.6 | 31.5 |
| 1 | 3 | 1 | Bal. | 4.1 | 35.9 |
| 1 | 3 | 2 | Bal. | 4.3 | 34.2 |
| 1 | 3 | 3 | Bal. | 4.5 | 32.6 |
| 1 | 3 | 4 | Bal. | 4.7 | 30.9 |
| 1 | 4 | 0 | Bal. | 4.3 | 33.7 |
| 1 | 4 | 1 | Bal. | 4.5 | 32.0 |
| 1 | 4 | 2 | Bal. | 4.7 | 30.3 |
| 2 | 0 | 6 | Bal. | 4.1 | 36.1 |
| 2 | 0 | 7 | Bal. | 4.2 | 34.4 |
| 2 | 0 | 8 | Bal. | 4.4 | 32.8 |
| 2 | 0 | 9 | Bal. | 4.6 | 31.2 |
| 2 | 1 | 4 | Bal. | 4.1 | 35.5 |
| 2 | 1 | 5 | Bal. | 4.3 | 33.9 |
| 2 | 1 | 6 | Bal. | 4.5 | 32.2 |
| 2 | 1 | 7 | Bal. | 4.7 | 30.6 |
| 2 | 2 | 2 | Bal. | 4.2 | 35.0 |
| 2 | 2 | 3 | Bal. | 4.4 | 33.3 |
| 2 | 2 | 4 | Bal. | 4.6 | 31.7 |
| 2 | 2 | 5 | Bal. | 4.8 | 30.0 |
| 2 | 3 | 0 | Bal. | 4.2 | 34.4 |
| 2 | 3 | 1 | Bal. | 4.4 | 32.8 |
| 2 | 3 | 2 | Bal. | 4.6 | 31.1 |
| 2 | 4 | 0 | Bal. | 4.7 | 30.5 |
| 3 | 0 | 4 | Bal. | 4.0 | 36.2 |
| 3 | 0 | 5 | Bal. | 4.2 | 34.6 |
| 3 | 0 | 6 | Bal. | 4.4 | 33.0 |
| 3 | 0 | 7 | Bal. | 4.6 | 31.4 |
| 3 | 1 | 2 | Bal. | 4.1 | 35.7 |
| 3 | 1 | 3 | Bal. | 4.3 | 34.1 |
| 3 | 1 | 4 | Bal. | 4.5 | 32.4 |
| 3 | 1 | 5 | Bal. | 4.7 | 30.8 |
| 3 | 2 | 0 | Bal. | 4.2 | 35.2 |
| 3 | 2 | 1 | Bal. | 4.4 | 33.5 |
| 3 | 2 | 2 | Bal. | 4.6 | 31.9 |
| 3 | 2 | 3 | Bal. | 4.7 | 30.2 |
| 3 | 3 | 0 | Bal. | 4.6 | 31.3 |
| 4 | 0 | 2 | Bal. | 4.0 | 36.4 |
| 4 | 0 | 3 | Bal. | 4.2 | 34.8 |
| 4 | 0 | 4 | Bal. | 4.4 | 33.2 |
| 4 | 0 | 5 | Bal. | 4.6 | 31.5 |
| 4 | 1 | 0 | Bal. | 4.1 | 35.9 |
| 4 | 1 | 1 | Bal. | 4.3 | 34.2 |
| 4 | 1 | 2 | Bal. | 4.5 | 32.6 |

TABLE 1-continued

| Chemical Composition (wt %) | | | | Tensile Strength | elongation |
|---|---|---|---|---|---|
| Ag | Bi | In | Sn | (kgf/mm$^2$) | (%) |
| 4 | 1 | 3 | Bal. | 4.7 | 31.0 |
| 4 | 2 | 0 | Bal. | 4.5 | 32.1 |
| 4 | 2 | 1 | Bal. | 4.7 | 30.4 |
| Comparative Example | | | | | |
| 1 | 0 | 7 | Bal. | 3.9 | 37.5 |
| 1 | 0 | 12 | Bal. | 4.9 | 29.4 |
| 1 | 1 | 15 | Bal. | 3.9 | 37.0 |
| 1 | 1 | 10 | Bal. | 4.9 | 28.8 |
| 1 | 2 | 2 | Bal. | 3.8 | 38.1 |
| 1 | 2 | 7 | Bal. | 4.8 | 29.8 |
| 1 | 3 | 0 | Bal. | 3.9 | 37.5 |
| 1 | 3 | 5 | Bal. | 4.9 | 29.3 |
| 1 | 4 | 3 | Bal. | 4.9 | 28.7 |
| 2 | 0 | 5 | Bal. | 3.9 | 37.7 |
| 2 | 0 | 10 | Bal. | 4.8 | 29.5 |
| 2 | 1 | 3 | Bal. | 3.9 | 37.1 |
| 2 | 1 | 8 | Bal. | 4.9 | 29.0 |
| 2 | 2 | 1 | Bal. | 3.9 | 36.6 |
| 2 | 2 | 6 | Bal. | 5.0 | 28.4 |
| 2 | 3 | 3 | Bal. | 4.8 | 29.5 |
| 2 | 4 | 1 | Bal. | 4.9 | 28.9 |
| 3 | 0 | 3 | Bal. | 3.8 | 37.9 |
| 3 | 0 | 8 | Bal. | 4.8 | 29.7 |
| 3 | 1 | 1 | Bal. | 3.9 | 37.3 |
| 3 | 1 | 6 | Bal. | 4.9 | 29.2 |
| 3 | 2 | 4 | Bal. | 4.9 | 28.6 |
| 3 | 3 | 1 | Bal. | 4.8 | 29.6 |
| 4 | 0 | 1 | Bal. | 3.8 | 38.1 |
| 4 | 0 | 6 | Bal. | 4.8 | 29.9 |
| 4 | 1 | 4 | Bal. | 4.9 | 29.3 |
| 4 | 2 | 2 | Bal. | 4.9 | 28.8 |
| Pb-63 Sn | | | | 3.8 | 30.0 |
| Sn-3.5 Ag | | | | 2.0 | 70.0 |

It is known from Table 1 that the solder of the present invention has a tensile strength equal to or greater than 4.0 kgf/mm$^2$ and an elongation equal to or greater than 30%, which are satisfactory mechanical properties, to attain the object of the present invention.

Thus, by the present invention as described above, a solder with mechanical properties as good as those of conventional Pb—Sn solder is provided.

What is claimed is:

1. A lead-free solder consisting of Ag, In, Bi and Sn, with 3.0 wt. %≦Ag≦4.0 wt. %, 3.0 wt. %≦In≦4.0 wt. %, 0.5 wt. %≦Bi ≦1.5 wt. % and the balance being Sn and the value of expression (1), A, is equal to or greater than 5.00 and the value of expression (2), B, is equal to or less than 6.90, $$A = [\text{Ag wt. \%}] + 1.23 [\text{Bi wt. \%}] + 0.52 [\text{In wt. \%}] \quad (1)$$

$$B = [\text{Ag wt. \%}] + 1.19 [\text{Bi wt. \%}] + 0.50 [\text{In wt. \%}] \quad (2),$$

said solder having a tensile strength of 4.0 kgf/mm$^2$ or higher, an elongation of 30% or more and a melting point of 212° C. or lower.

* * * * *